United States Patent
Luo

(10) Patent No.: US 10,265,611 B2
(45) Date of Patent: Apr. 23, 2019

(54) CONTROL DEVICE AND METHOD FOR INTELLIGENT BASKETBALL SHOOTING MACHINE

(71) Applicant: Chunfang Luo, Dongguan (CN)

(72) Inventor: Chunfang Luo, Dongguan (CN)

( * ) Notice: Subject to any disclaimer, the term of this patent is extended or adjusted under 35 U.S.C. 154(b) by 225 days.

(21) Appl. No.: 15/134,397

(22) Filed: Apr. 21, 2016

(65) Prior Publication Data
US 2017/0151493 A1 Jun. 1, 2017

(30) Foreign Application Priority Data

Nov. 30, 2015 (CN) .......................... 2015 1 0864121

(51) Int. Cl.
| | |
|---|---|
| *A63F 7/20* | (2006.01) |
| *A63F 7/06* | (2006.01) |
| *H04W 4/80* | (2018.01) |
| *G05B 15/02* | (2006.01) |
| *A63B 63/08* | (2006.01) |
| *A63B 71/06* | (2006.01) |
| *A63B 69/00* | (2006.01) |

(52) U.S. Cl.
CPC .......... *A63F 7/0612* (2013.01); *A63F 7/0664* (2013.01); *G05B 15/02* (2013.01); *H04W 4/80* (2018.02); *A63B 63/083* (2013.01); *A63B 69/0071* (2013.01); *A63B 71/0622* (2013.01); *A63B 71/0669* (2013.01); *A63B 2071/0625* (2013.01); *A63B 2220/17* (2013.01); *A63B 2225/50* (2013.01)

(58) Field of Classification Search
CPC .............. A63B 63/083; A63B 71/0669; A63B 71/0622; A63B 2071/0625; A63F 7/0612; A63F 7/0664

USPC ......................................................... 273/317.3
See application file for complete search history.

(56) References Cited

U.S. PATENT DOCUMENTS

| | | | | |
|---|---|---|---|---|
| 5,480,147 A | * | 1/1996 | Ethier ................ | A63B 24/0021 273/317.3 |
| 6,241,628 B1 | * | 6/2001 | Jenkins .............. | A63B 69/0071 124/6 |
| 6,536,770 B1 | * | 3/2003 | Yang ...................... | A63B 63/06 273/317.3 |

(Continued)

OTHER PUBLICATIONS

Provisional U.S. Appl. No. 62/100,801, filed Jan. 7, 2015.*

*Primary Examiner* — Michael A Cuff
(74) *Attorney, Agent, or Firm* — Gokalp Bayramoglu

(57) ABSTRACT

The disclosure refers to a control device and method for an intelligent basketball shooting machine, the device includes a control module, a blue-tooth communication module, a display module, a control switch, a power-supplying module, and a first sensor and a second sensor both for counting; the first sensor is used for catching amount of goals in one basket of basketball shooting machine, and the second sensor used for catching amount of goals in another basket of basketball shooting machine; the first sensor, second sensor, blue-tooth communication module, display module, control switch and power-supplying module are respectively connected with control module; the disclosure makes the basketball shooting machine go on single game or online game, besides, the player can play the shooting game with friends by remote way just through an intelligent terminal, which increases interest and convenience.

18 Claims, 3 Drawing Sheets

(56) References Cited

U.S. PATENT DOCUMENTS

| | | | | |
|---|---|---|---|---|
| 8,616,553 | B1* | 12/2013 | Tsai | A63B 61/02 |
| | | | | 273/317.3 |
| 9,474,953 | B1* | 10/2016 | Duke | A63B 69/0071 |
| 2008/0042358 | A1* | 2/2008 | Chen | A63B 69/0071 |
| | | | | 273/317.3 |
| 2008/0254866 | A1* | 10/2008 | Young | A63B 24/0021 |
| | | | | 463/25 |
| 2009/0045578 | A1* | 2/2009 | Wang | A63B 24/0003 |
| | | | | 273/317.3 |
| 2012/0029666 | A1* | 2/2012 | Crowley | A63B 24/0062 |
| | | | | 700/91 |
| 2012/0142458 | A1* | 6/2012 | He | A63B 63/083 |
| | | | | 473/480 |
| 2015/0265897 | A1* | 9/2015 | Gordon | A63B 69/0071 |
| | | | | 473/447 |
| 2016/0096071 | A1* | 4/2016 | Ianni | A63B 24/0062 |
| | | | | 700/91 |
| 2016/0193518 | A1* | 7/2016 | Baxter | A63B 69/0071 |
| | | | | 473/450 |
| 2017/0128804 | A1* | 5/2017 | Bruce | A63B 63/083 |
| 2017/0128814 | A1* | 5/2017 | Ianni | A63B 71/0605 |

* cited by examiner

CONTROL DEVICE AND METHOD FOR INTELLIGENT BASKETBALL SHOOTING MACHINE

TECHNICAL FIELD

The disclosure generally relates to an intelligent basketball shooting machine, and more particularly to a control device and method for an intelligent basketball shooting machine.

BACKGROUND OF THE INVENTION

Basketball shooting machine is the most fashion sport entertainment equipment that let the shooting act out of whole basketball sport act. Moreover, the player can use the basketball shooting machine without any basketball skills. So the basketball shooting machine is beneficial and interesting, combines sport with entertainment, has a suitable strength to play and is easy to handle. However, conventional basketball shooting machine is only for one person to play, or provide two baskets respectively for two people to interact and compete. Therefore, such basketball shooting machine is restricted by certain conditions and impossible to interact and compete as remote way.

SUMMARY

In order to overcome the shortage of prior technology, the objective of the disclosure is to provide a control device and method for an intelligent basketball shooting machine which makes the basketball shooting machine go on single game or online game, besides, the player can play the shooting game with friends by remote way just through an intelligent terminal.

In order to overcome the above described shortcomings, the present disclosure provides following technical solutions.

Solution 1:

A control device for an intelligent basketball shooting machine, includes a control module, a communication module, a display module, a control switch, a power-supplying module, and a first sensor and a second sensor both for counting; wherein, the first sensor is used for catching amount of goals in one basket of the basketball shooting machine, the second sensor is used for catching amount of goals in another basket of the basketball shooting machine, the first sensor, the second sensor, the communication module, the display module, the control switch and the power-supplying module are electrically connected with the control module respectively, the display module includes a timing display module, a first counting display module and a second counting display module, and the control module is used for responding a switch control signal which is transmitted by the control switch; when in the first working mode, the control module controls a work state of the first sensor, the second sensor, the timing display module, the first counting display module and the second counting display module; when in the second working mode, the control module controls the communication module to send a signal, which cause the communication module wirelessly connects to an intelligent terminal and receive a control signal sent by intelligent terminal, in order to control a work state of the first sensor, the timing display module, the first counting display module and the second counting display module.

Preferably, the control device for an intelligent basketball shooting machine further includes a loudspeaker, and the loudspeaker electrically connects with the control module.

Preferably, the communication module is a blue-tooth communication module.

Preferably, the control switch is a three section type slide switch.

Preferably, the power-supplying module is a lithium battery, a dry cell or AC transformer.

Preferably, the first sensor and the second sensor which are infrared sensors or proximity sensors are respectively fixed in the corresponding basket.

Preferably, the first sensor and the second sensor which are elastic press switches are respectively just below the corresponding basket.

Solution 2:

A control method for an intelligent basketball shooting machine, which is applied to control module of the control device for an intelligent basketball shooting machine of Solution 1, includes following steps:

S1: receiving a switch control signal which is transmitted by the control switch; the switch control signal includes a closing signal, a first working mode signal and a second working mode signal; if the switch control signal is the first working mode signal, the control module enters a single working mode; if the switch control signal is the second working mode signal, performing S2;

S2: entering a online working mode and controlling the communication module to enter a connection wait state until the communication module set up a connection with an intelligent terminal, and the intelligent terminal set up a network connection with cloud, performing S3;

S3: receiving a timing start instruction sent by the intelligent terminal, then performing a counting communication step with intelligent terminal;

S4: receiving a timing end instruction sent by the intelligent terminal, then sending a final counting information to intelligent terminal.

Preferably, the particular single working mode thereof is as follows: sending a working start signal to the first sensor and the second sensor, sending a timing start signal to the timing display module, and, sending a counting information of the first sensor to the first counting display module, and sending a counting information of the second sensor to the second counting display module.

Preferably, the counting communication step with intelligent terminal thereof is as follows: controlling the first sensor, the timing display module, the first counting display module and the second counting display module to start to work; when in a presetting time interval, the control module sends the counting information displayed on the first counting display module to the intelligent terminal, meanwhile, receives an opponent's counting information sent by the intelligent terminal and displays it on the second counting display module; wherein, the counting information sent to the intelligent terminal is uploaded to cloud, and the opponent's counting information is downloaded from cloud by the intelligent terminal.

Preferably, the presetting time interval is 0.5 second.

Preferably, the intelligent terminal is a smartphone or a smart tablet PC.

Solution 3:

A control device for an intelligent basketball shooting machine, comprising a communication module, a display module, a control switch, a power-supplying module, a sensor for counting amount of goals in one basket of the basketball shooting machine, and a control module electrically connecting with the communication module, the display module, the control switch, the power-supplying module and the sensor, wherein the display module includes a timing display module, a first counting display module and a second counting display module, the control switch is capable of transmitting different switch control signal to the control module, and controlling different work modes; during in a working mode, the control module controls the communication module to transmit a timing instruction to another intelligent basketball shooting machine, receive a counting information from another intelligent basketball shooting machine and display it on the second counting display module.

Preferably, the communication module is a blue-tooth communication module.

Preferably, the control module controls the blue-tooth communication module to send a blue-tooth signal, which cause the blue-tooth communication module wirelessly connect to another intelligent basketball shooting machine and transmit the timing instruction to another intelligent basketball shooting machine.

Preferably, the switch control signal includes a closing signal, a first working mode signal and a second working mode signal; when the control switch transmits the first working mode signal, the control module enters the first working mode; when the control switch transmits the second working mode signal, the control module enters the second working mode.

Preferably, when the switch control signal is the second working mode signal, the control module controls the communication module to transmit a timing instruction to another intelligent basketball shooting machine, receive a counting information from another intelligent basketball shooting machine and display it on the second counting display module.

Preferably, the timing instruction includes a timing start instruction and a timing end instruction.

Beneficial effects of the disclosure are as follows:

The disclosure makes the basketball shooting machine go on single game or online game, besides, the player can play the shooting game with friends by remote way just through an intelligent terminal, which increases interest and convenience.

Figure 1:
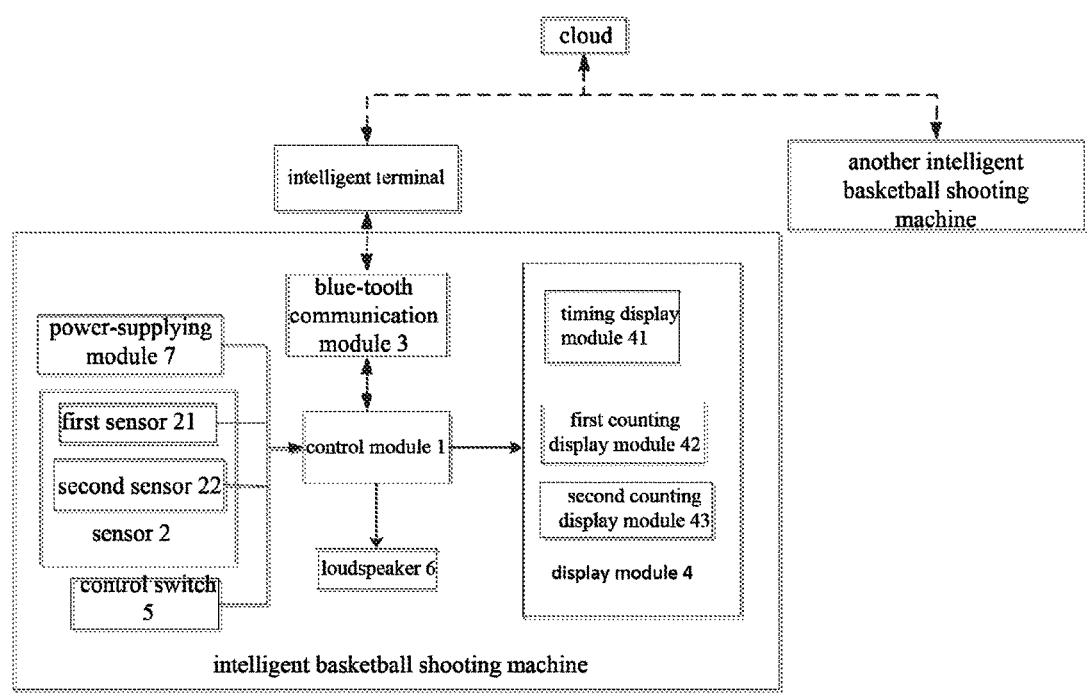
FIG. 1 is a structural diagram of a control device for the intelligent basketball shooting machine.

Reference numbers in the drawings are as follow:

1, control module; 2, sensors; 21, the first sensor; 22, the second sensor; 3, blue-tooth communication module; 4, display module; 41, timing display module; 42, first counting display module; 43, second counting display module; 5, a control switch; 6, a loudspeaker; 7, power-supplying module.

DETAILED DESCRIPTION

The disclosure will be described hereinafter in detail with reference to the accompanying drawings on the basis of preferred embodiments.

Figure 3:
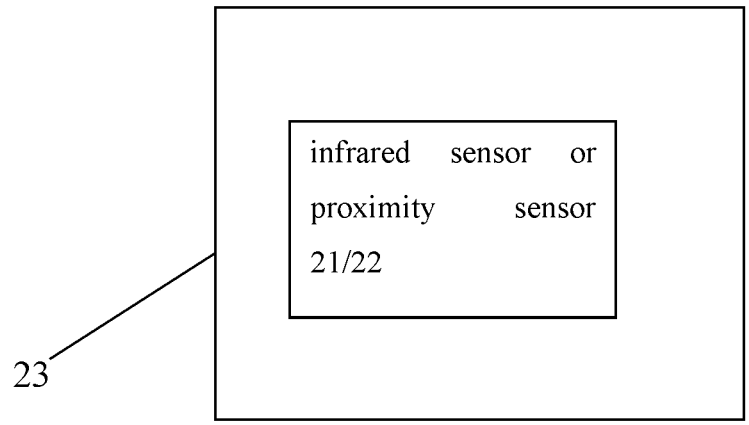
FIG. 3 illustrates an infrared sensor or a proximity sensor fixed in a basket.
Figure 4:
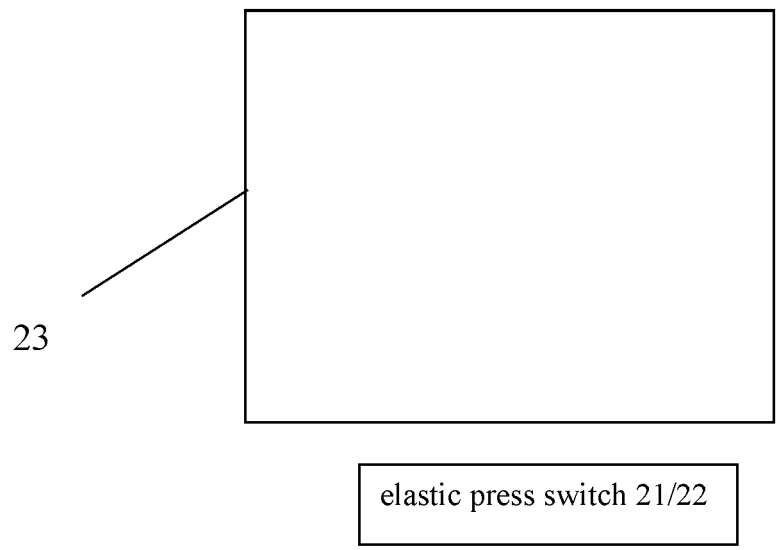
FIG. 4 illustrates an elastic press switch below a basket.

Referring to the FIG. 1, FIG. 3 and FIG. 4, a control device for an intelligent basketball shooting machine, includes a control module 1, a blue-tooth communication module 3, a display module 4, a control switch 5, a loudspeaker 6, a power-supplying module 7, and a plurality of sensors 2 for counting which are respectively named as a first sensor 21 and a second sensor 22 in this embodiment. The first sensor 21 is used for catching amount of goals in one basket 23 of basketball shooting machine, and the second sensor 22 is used for catching amount of goals in another basket of basketball shooting machine. The first sensor 21, the second sensor 22, the blue-tooth communication module 3, the display module 4, the control switch 5, the loudspeaker 6 and the power-supplying module 7 are electrically connected with the control module 1 respectively. The display module 4 includes a timing display module 41, a first counting display module 42 and a second counting display module 43. The control switch 5 is a three section type slide switch which is with function of closing or switching to the first working mode and the second working mode. The power-supplying module 7 can be a lithium battery, a dry cell or AC transformer. The first sensor 21 and the second sensor 22 which both used for counting can be infrared sensors or proximity sensors 21/22 and are respectively fixed in the corresponding basket 23. When the basketball falls down from the basket, the first sensor 21 or the second sensor 22 is capable of sending a feedback signal to the control module 1 in order to achieving counting. In addition, the first sensor 21 and the second sensor 22 which are elastic press switches 21/22, and respectively positioned in basketball ramp just below the corresponding basket 23. The basketball will touch the elastic press switch when it falls down from the basket 23, and then the elastic press switch will close under pressure so as to count, the elastic press switch will reset when the pressure is gone.

The control switch 5 is capable of controlling the control module 1 in the first working mode or the second working mode. When the control module 1 is in the first working mode, that means in the single working mode, then the control module 1 controls the first sensor 21, the second sensor 22, the timing display module 41, the first counting display module 42 and the second counting display module 43 to start to work. Specifically, the timing display module 41 starts to display countdown, and the control module 1 receives a sensing signal form the first sensor 21 so as to count and displays a counting information on the first counting display module 42. Besides, the control module 1 receives a sensing signal form the second sensor 22 so as to count and displays a counting information on the second counting display module 43.

When the control module 1 is in the second working mode, that means in the online working mode, then the control module 1 controls the blue-tooth communication module 3 to send a blue-tooth signal, until the blue-tooth communication module 3 set up a blue-tooth connection with an intelligent terminal, and the intelligent terminal can set up a network connection with cloud. User sends a timing start instruction by means of the intelligent terminal, meanwhile, the control module 1 controls the first sensor 21, the timing display module 41, the first counting display module 42 and the second counting display module 43 to start to work. When in presetting time interval, the control module 1 sends the counting information displayed on the first counting display module 42, then the intelligent terminal sends the counting information to cloud, meanwhile, the control module 1 receive an opponent's counting information sent by the intelligent terminal and displays it on the second counting display module 43. That is to say, the counting information of user's goals is displayed on the first counting display module 42, the counting information of opponent's goals is displayed on the second counting display module 43. The opponent's counting information is downloaded from cloud by the intelligent terminal. When the intelligent terminal sends a timing end instruction to the control module 1, the control module 1 sends a final counting information to the intelligent terminal. That is to say, the counting information of both can be directly seen from the intelligent terminal and the control module 1.

The control device for an intelligent basketball shooting machine of the disclosure makes the basketball shooting machine go on single game or online game; besides, the player can play the shooting game with friends by remote way just through an intelligent terminal, which increases interest and convenience.

Figure 2:
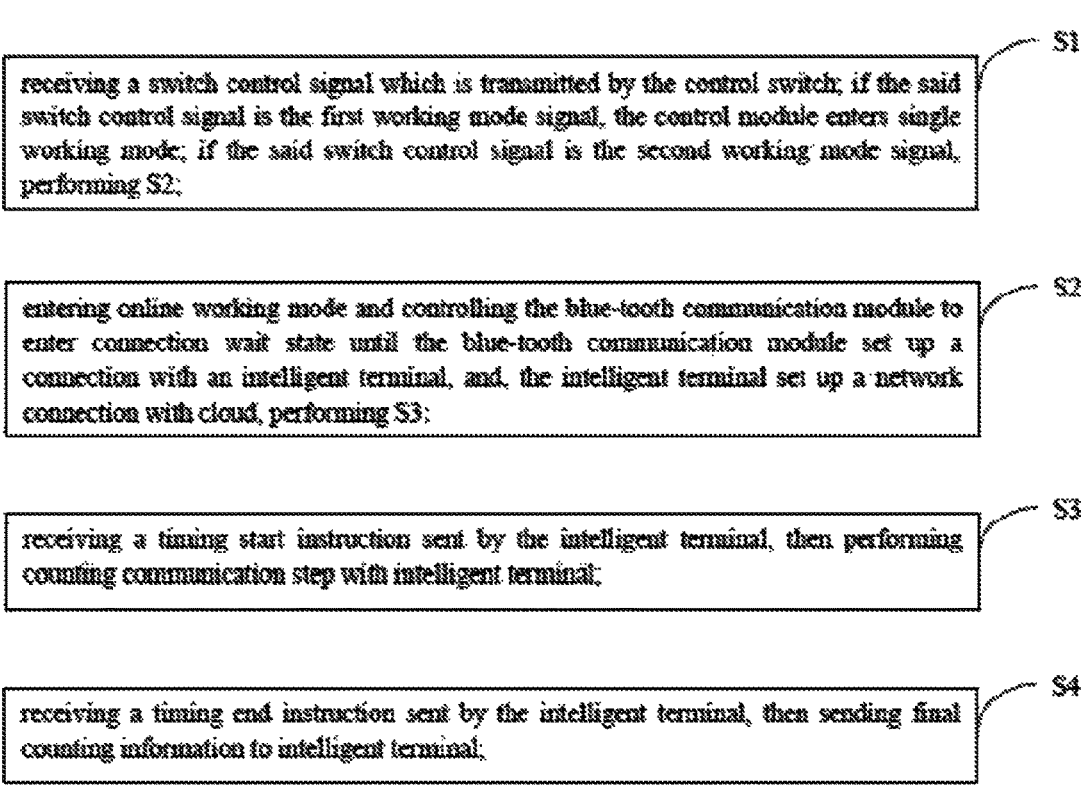
FIG. 2 is a flow chart of a control method for the intelligent basketball shooting machine of FIG. 1.

Referring to the FIG. 2, the present embodiment further proposes a control method for an intelligent basketball shooting machine, which is applied to aforesaid control module of the control device for an intelligent basketball shooting machine, including the steps of:

S1: receiving a switch control signal which is transmitted by the control switch. The switch control signal includes a closing signal, a first working mode signal and a second working mode signal. If the switch control signal is the first working mode signal, the control module enters a single working mode. If the switch control signal is the second working mode signal, performing S2;

S2: entering a online working mode and controlling the blue-tooth communication module to enter a connection wait state until the blue-tooth communication module set up a connection with an intelligent terminal, and the intelligent terminal set up a network connection with cloud, performing S3;

S3: receiving a timing start instruction sent by the intelligent terminal, then performing a counting communication step with intelligent terminal;

S4: receiving a timing end instruction sent by the intelligent terminal, then sending a final counting information to intelligent terminal.

Preferably, the particular single working mode thereof is as follows: sending a working start signal to the first sensor and the second sensor, sending a timing start signal to the timing display module, and sending a counting information of the first sensor to the first counting display module, and sending a counting information of the second sensor to the second counting display module.

Preferably, the counting communication step with intelligent terminal thereof is as follows: controlling the first sensor, the timing display module, the first counting display module and the second counting display module to start to work. When in a presetting time interval, the control module sends the counting information displayed on the first counting display module to the intelligent terminal, meanwhile, receives an opponent's counting information sent by the intelligent terminal and displays it on the second counting display module. The counting information sent to the intelligent terminal is uploaded to cloud, and the opponent's counting information is downloaded from cloud by the intelligent terminal.

Preferably, the presetting time interval is 0.5 second.

Preferably, the intelligent terminal is a smartphone or a smart tablet PC.

Various modifications could be made to the embodiments by those of ordinary skill in the art without departing from the true spirit and scope of the disclosure. And those modified embodiments are covered by the claims of the disclosure.

The invention claimed is:

1. A control device for an intelligent basketball shooting machine, comprising a control module, a communication module, a display module, a control switch, a power-supplying module, and a first sensor and a second sensor both for counting; wherein, the first sensor is used for catching amount of goals in one basket of the basketball shooting machine, the second sensor is used for catching amount of goals in another basket of the basketball shooting machine, the first sensor, the second sensor, the communication module, the display module, the control switch and the power-supplying module are electrically connected with the control module respectively, the display module comprises a timing display module, a first counting display module and a second counting display module, and the control module is used for responding a switch control signal which is transmitted by the control switch; when in a first working mode, the control module controls a work state of the first sensor, the second sensor, the timing display module, the first counting display module and the second counting display module; when in a second working mode, the control module controls the communication module to send a signal, which cause the communication module wirelessly connect to an intelligent terminal and receive a control signal sent by the intelligent terminal, in order to control a work state of the first sensor, the timing display module, the first counting display module and the second counting display module, wherein when in the second working mode, counting information of a user is displayed on the first counting display module, and the control module receives an opponent's counting information from another intelligent basketball shooting machine via the intelligent terminal and display it on the second counting display module.

2. The control device for an intelligent basketball shooting machine of claim 1, wherein the control device for an intelligent basketball shooting machine further comprises a loudspeaker, and the loudspeaker electrically connects with the control module.

3. The control device for an intelligent basketball shooting machine of claim 1, wherein the communication module is a blue-tooth communication module.

4. The control device for an intelligent basketball shooting machine of claim 1, wherein the control switch is a three section type slide switch.

5. The control device for an intelligent basketball shooting machine of claim 1, wherein the power-supplying module is a lithium battery, a dry cell or AC transformer.

6. The control device for an intelligent basketball shooting machine of claim 1, wherein the first sensor and the second sensor which are infrared sensors or proximity sensors are respectively fixed in the corresponding basket.

7. The control device for an intelligent basketball shooting machine of claim 1, wherein the first sensor and the second sensor which are elastic press switches are respectively just below the corresponding basket.

8. A control method for an intelligent basketball shooting machine, which is applied to the control module of the control device for an intelligent basketball shooting machine of claim 1, comprising the steps of:

S1: receiving a switch control signal which is transmitted by the control switch; the switch control signal comprises a closing signal, a first working mode signal and a second working mode signal; if the switch control signal is the first working mode signal, the control module enters a single working mode; if the switch control signal is the second working mode signal, performing S2;

S2: entering a online working mode and controlling the communication module to enter a connection wait state until the communication module set up a connection with an intelligent terminal, and the intelligent terminal set up a network connection with cloud, performing S3;

S3: receiving a timing start instruction sent by the intelligent terminal, then performing a counting communication step with intelligent terminal;

S4: receiving a timing end instruction sent by the intelligent terminal, then sending a final counting information to intelligent terminal.

9. The control method for an intelligent basketball shooting machine of claim 8, wherein the particular single working mode thereof is as follows: sending a working start signal to the first sensor and the second sensor, sending a timing start signal to the timing display module, and sending a counting information of the first sensor to the first counting display module, and sending a counting information of the second sensor to the second counting display module.

10. The control method for an intelligent basketball shooting machine of claim 8, wherein the counting communication step with intelligent terminal thereof is as follows: controlling the first sensor, the timing display module, the first counting display module and the second counting display module to start to work; when in a presetting time interval, the control module sends the counting information displayed on the first counting display module to the intelligent terminal, meanwhile, receives an opponent's counting information sent by the intelligent terminal and displays it on the second counting display module; wherein, the counting information sent to the intelligent terminal is uploaded to cloud, and the opponent's counting information is downloaded from cloud by the intelligent terminal.

11. The control method for an intelligent basketball shooting machine of claim 10, wherein the presetting time interval is 0.5 second.

12. The control method for an intelligent basketball shooting machine of claim 8, wherein the intelligent terminal is a smartphone or a smart tablet PC.

13. A control device for an intelligent basketball shooting machine, comprising a communication module, a display module, a control switch, a power-supplying module, a sensor for counting amount of goals in one basket of the basketball shooting machine, and a control module electrically connecting with the communication module, the display module, the control switch, the power-supplying module and the sensor, wherein the display module comprises a timing display module, a first counting display module and a second counting display module, the control switch is capable of transmitting different switch control signal to the control module, and controlling different work modes; during in a working mode, the control module controls the communication module to wirelessly connect to an intelligent terminal, transmit a timing instruction to another intelligent basketball shooting machine, receive a counting information from another intelligent basketball shooting machine via the intelligent terminal and display it on the second counting display module.

14. The control device for an intelligent basketball shooting machine of claim 13, wherein the communication module is a blue-tooth communication module.

15. The control device for an intelligent basketball shooting machine of claim 14, wherein the control module controls the blue-tooth communication module to send a blue-tooth signal, which cause the blue-tooth communication module wirelessly connect to another intelligent basketball shooting machine and transmit the timing instruction to another intelligent basketball shooting machine.

16. The control device for an intelligent basketball shooting machine of claim 13, wherein the switch control signal comprises a closing signal, a first working mode signal and a second working mode signal; when the control switch transmits the first working mode signal, the control module enters the first working mode; when the control switch transmits the second working mode signal, the control module enters the second working mode.

17. The control device for an intelligent basketball shooting machine of claim 16, wherein when the switch control signal is the second working mode signal, the control module controls the communication module to transmit a timing instruction to another intelligent basketball shooting machine, receive a counting information from another intelligent basketball shooting machine and display it on the second counting display module.

18. The control device for an intelligent basketball shooting machine of claim 13, wherein the timing instruction comprises a timing start instruction and a timing end instruction.

* * * * *